Nov. 4, 1924.  1,514,506
C. G. COOK
PISTON
Filed May 9, 1923    2 Sheets-Sheet 1
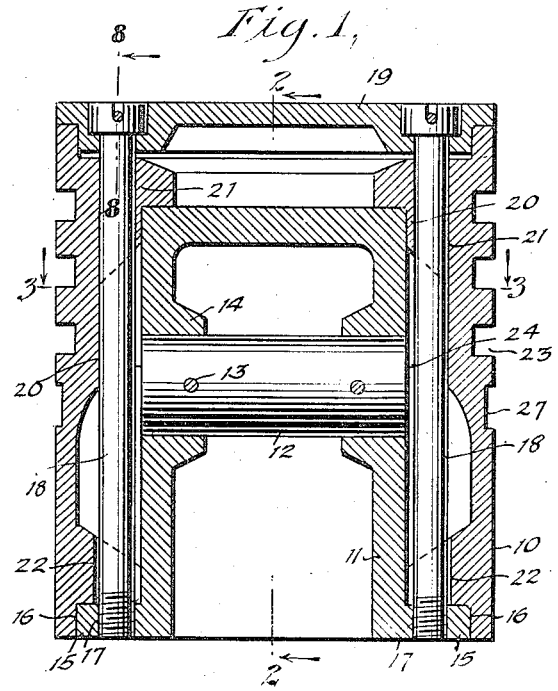
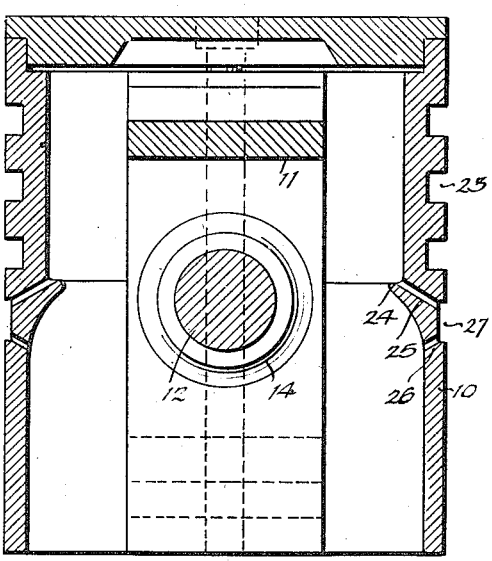
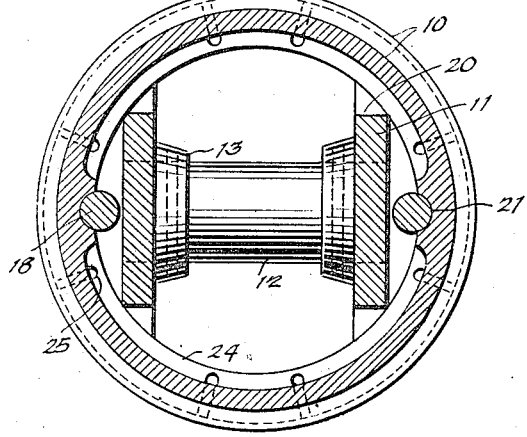
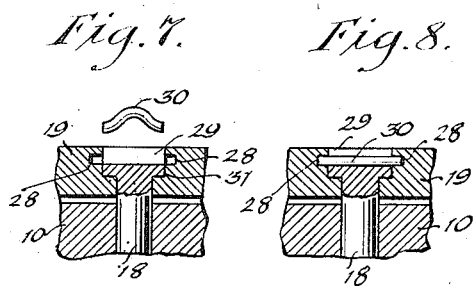
WITNESSES
INVENTOR
C. G. Cook
BY
ATTORNEYS Nov. 4, 1924.   1,514,506
C. G. COOK
PISTON
Filed May 9, 1923   2 Sheets-Sheet 2
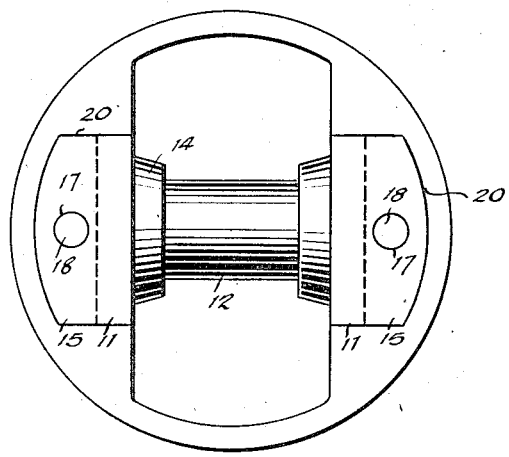
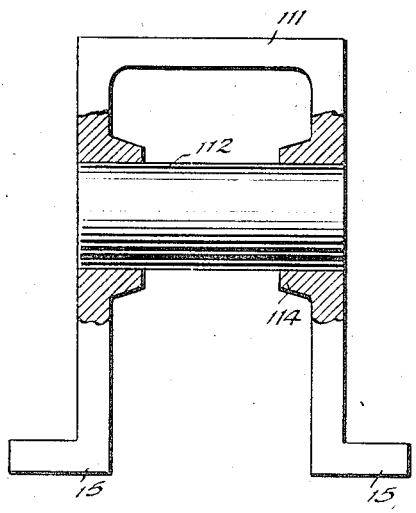
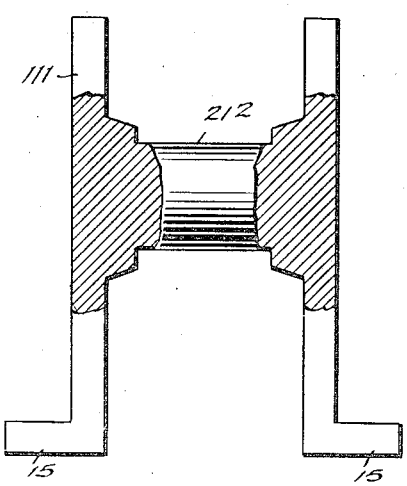
WITNESSES
INVENTOR
C. G. Cook
BY
ATTORNEYS Patented Nov. 4, 1924.

1,514,506

UNITED STATES PATENT OFFICE.

CASS G. COOK, OF DETROIT, MICHIGAN, ASSIGNOR OF ONE-HALF TO AUDLEY N. McNEELY, OF DETROIT, MICHIGAN.

PISTON.

Application filed May 9, 1923. Serial No. 637,873.

*To all whom it may concern:*

Be it known that I, CASS G. COOK, a citizen of the United States of America, and a resident of Detroit, in the county of Wayne and State of Michigan, have invented a new and Improved Piston, of which the following is a description.

My invention relates to a piston and is more particularly intended for embodiment in the piston of an internal combustion motor.

The general object of my invention is to promote convenience in the examination or repair of the piston or piston rings without practically dismantling the motor as is the general practice for its inspection or its repair, the partial or complete dismantling involving the danger of damage to the cylinder. At present owing to the trouble and inconvenience of making a thorough examination for the making of slight repairs or adjustment the owner in many cases entirely neglects to examine the rings, whereby the cylinder walls are damaged with the resulting loss of compression and power. The stated object is attained by a construction permitting of the dismemberment of the piston assemblage and the ready lifting of the piston from the cylinder, the step of removing the piston involving the minimum expenditure of labor and time and involving little trouble.

A further object of the invention is to provide a piston assemblage in which the piston body may be so formed as to permit of equipping the same with various arrangements of rings respecting their width or form and resulting in a more effective ring arangement to prevent pumping of oil to reduce the carbon and develop the maximum power.

A further object of the invention is to provide a construction in which a piston pin cannot work loose and damage the cylinder walls as sometimes occur with arrangements now in use; a specific object being to provide a construction in which the piston pin is relieved of strain except as pulled down by the connecting rod on the suction stroke as will more clearly appear from the specific description following.

Reference is to be had to the accompanying drawings forming a part of this specification, it being understood that the drawings are merely illustrative of practical examples of the invention.

Figure 1 is a vertical section of a complete piston assemblage embodying my invention;

Figure 2 is a vertical section in the plane at right angles to Figure 1 as indicated by the line 2—2, Figure 1;

Figure 3 is a horizontal section in the plane indicated by the line 3—3, Figure 1;

Figure 4 is an inverted plan view of the piston assemblage;

Figures 5 and 6 are partly sectional side elevations showing modified forms of the piston pin element;

Figure 7 is a detail in vertical section showing the manner of locking the bolts against turning, the locking pin being shown separate and in the form before being applied to the bolt;

Figure 8 is a view similar to Figure 7 but with the locking pin in position, the section of Figure 8 being on the line 8—8 of Figure 1.

In carrying out my invention in accordance with the illustrated example a cylindrical piston body or shell 10 is provided of a single piece to present unbroken annular continuity at the periphery.

Within the shell 10 is the piston pin element 11 having the transverse pin 12 thereof to receive the connecting rod (not shown) fastened in the form shown in Figure 1 by transverse fastening pins 13 passing through the pin 12 and through bosses 14 on the element 11.

Modifications of the pin element 11 are shown in Figures 5 and 6. In Figure 5 the pin element designated 111 as the pin 112 to receive the connecting rod secured by reason of a driving fit in the sides of the element 11 and in the bosses 114 thereof. The elements 11 and 111 are U-shaped, the sides being joined by a front cross bar. In the form shown in Figure 6 the pin element 211 is generally of H-form comprising parallel side members and an integral pin 212 to receive the connecting rod. In all three forms of the piston pin 11, 111 and 211, the sides are formed at the rear ends with laterally directed lugs 15 which are accommodated in rabbets 16 in the rear end of the body 10 so that the pin element lies flush with the rear end of said body 10. The lugs 15 are formed with bolt holes 17 parallel with the axis of the piston and are adapted to be engaged by bolts 18 at diametrically opposite sides of the piston and parallel with the axis thereof. The bolts 18 pass through a separate piston head or cap 19 and they serve to rigidly hold together the body 10, the pin element 11, 111, or 211 and the cap 19. The sides of the pin element as 11, for example, are received in vertical grooves 20 formed at the interior of the body 10 at diametrically opposite sides whereby said pin element is prevented from turning. The bolts 20 are counter-sunk in the cap 19, passed through alined holes 21, 22 in the body 10 and engage the threads of the bolt holes 17 of the lugs 15 of the piston pin element 11.

By the above described construction in order to remove the piston the bolts 18 are removed which will afford access to the pin 12 to detach the connecting rod and with the removal of the bolts the piston body 10 may be lifted from the cylinder without damaging the same. The element 11 may then be readily detached from the connecting rod if that is found necessary so that the complete piston assemblage may be removed from the cylinder without disconnecting the connecting rod from the crank shaft of the motor. The described assemblage lends itself to the employment of any practical number of piston rings in annular grooves 23.

In order to effectively lubricate the piston and cylinder with the described assemblage, an annular internal shoulder 24 is formed on the body 10 projecting laterally inward a sufficient extent to trap oil rising or splashed into the interior of the piston. From the annular shoulder 24 oil holes 25 lead laterally outward obliquely to the external surface of the piston. Additional oil holes 26 may be provided extending through the walls of the body 10 rearward of the shoulder 24. Said oil holes may terminate at their outer ends at an annular groove 27 in the body 10.

In order to lock the bolts 18 against turning the cap 19 is formed in the counter-sink thereof with diametrically opposed lateral blind recesses 28 and each bolt 18 is formed in the head thereof with a slot 29 which may be brought into register with the recesses 28. A locking pin 30 of comparatively soft wire initially has a bent form to enter the counter-sink 31 in the cap 19 and be accommodated in the slot 29 when the bolt 18 is in place after which the pin 30 is forced into a straight form as in Figure 8 to lie across the slot 29 and to project into the recesses 28.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A piston comprising a cylindrical body, an element fitting within said body and having a transverse pin adapted for connection with a connecting rod, said body having interior grooves forming a guideway for movement of said element into or out of position in the body, and a cap on said body at the front end, bolts extending longitudinally through said cap and body, and means on said element at the rear end threaded to be engaged by said bolts for firmly holding the whole solidly together.

2. A piston including a cylindrical hollow body, an element adapted to be positioned within said body or removed therefrom, and longitudinal bolts extending through said body from the front at the sides of said element and engaging said element at the rear end thereof and serving to firmly hold the body and said element against separation.

3. A piston including a cylindrical hollow body, an element adapted to be positioned within said body or removed therefrom, a separate cap on said body at the front end, and longitudinal bolts passing longitudinally in said body at the sides of said element and through said cap, and lateral members on said element at the rear end and engaged by said bolts to hold the body, cap and said elements against separation.

4. A piston including a hollow tubular body of unbroken annular continuity and having annular grooves adapted to receive piston rings, a separate element fitting within said body and held against turning movement therein, said element having means to secure it to a connecting rod, a cap on said body, and bolts passing through said cap and body outside of said element, and having threaded engagement with said element to hold the parts in rigid relation.

5. A piston including a hollow tubular body of unbroken annular continuity and having annular grooves adapted to receive piston rings, a separate element fitting within said body and held against turning movement therein, said element having means to secure it to a connecting rod, a cap on said body, and bolts passing through said cap and body outside of said element, and having threaded engagement with said element to hold the parts in rigid relation; together with means to lock said bolts to said cap to prevent disconnection between the bolts and said element.

CASS G. COOK.